(12) United States Patent
Eldering

(10) Patent No.: US 7,870,576 B2
(45) Date of Patent: Jan. 11, 2011

(54) TARGETED ADVERTISING THROUGH ELECTRONIC PROGRAM GUIDE

(75) Inventor: Charles A. Eldering, Doylestown, PA (US)

(73) Assignee: Prime Research Alliance E., Inc., Tortola (VG)

( * ) Notice: Subject to any disclaimer, the term of this patent is extended or adjusted under 35 U.S.C. 154(b) by 422 days.

(21) Appl. No.: 11/475,354

(22) Filed: Jun. 27, 2006

(65) Prior Publication Data

US 2006/0248555 A1    Nov. 2, 2006

Related U.S. Application Data

(63) Continuation of application No. 09/658,204, filed on Sep. 8, 2000, now abandoned.

(51) Int. Cl.
| | |
|---|---|
| H04N 7/10 | (2006.01) |
| H04N 7/025 | (2006.01) |
| H04N 5/445 | (2006.01) |
| G06F 3/00 | (2006.01) |
| G06F 13/00 | (2006.01) |
| G06Q 30/00 | (2006.01) |

(52) U.S. Cl. .............................. 725/34; 725/32; 725/42; 705/14.49

(58) Field of Classification Search .................. 725/42, 725/46, 32, 34; 705/14.49
See application file for complete search history.

(56) References Cited

U.S. PATENT DOCUMENTS 5,233,423 A    8/1993    Jernigan (Continued)

FOREIGN PATENT DOCUMENTS

WO    WO9827723    6/1998

(Continued)

OTHER PUBLICATIONS

Knudson et al. U.S. Appl. No. 09/034,939 specification and drawings.*

(Continued)

*Primary Examiner*—Christopher Kelley
*Assistant Examiner*—Usha Raman
(74) *Attorney, Agent, or Firm*—Carlineo, Spicer & Kee, LLC

(57) ABSTRACT

A mechanism for matching Electronic Program Guide (EPG) advertisements to subscribers or groups of subscribers and delivering those advertisements within the EPG. The subscribers are initially characterized in different groups by using commercially available data, such as demographic data. Furthermore, the groups of subscribers may be formed according to their characteristics. These characteristics may be derived from, but are not limited to, demographic data, geographic information or individual subscriber selection data. Subsequent to the formation of the groups, suitable advertisements to be placed in the EPG avails are selected, based on the matching of the advertisement characteristics to the characteristics of the groups, wherein the EPG avails are the advertising opportunities available within the EPG. Different versions of the EPG having targeted advertisements may be created, and the different versions may be placed on a download server for transmission over an access system to the subscriber. At the subscriber end, the different versions of the EPG may be received and the subscriber end, being assigned to a particular group, may receive the EPG which corresponds to that group. The subscriber end generally comprises a suitable subscriber interface, such as, a set-top box (STB) or a cable-ready television having a unique identification.

30 Claims, 11 Drawing Sheets

U.S. PATENT DOCUMENTS

| | | | |
|---|---|---|---|
| 5,283,639 | A | 2/1994 | Esch |
| 5,410,344 | A | 4/1995 | Graves |
| 5,446,919 | A | 8/1995 | Wilkins |
| 5,485,197 | A | 1/1996 | Hoarty |
| 5,515,098 | A | 5/1996 | Carles |
| 5,600,364 | A | 2/1997 | Hendricks |
| 5,635,978 | A | 6/1997 | Alten |
| 5,636,346 | A | 6/1997 | Saxe |
| 5,657,072 | A | 8/1997 | Aristides |
| 5,666,645 | A | 9/1997 | Thomas |
| 5,699,107 | A | 12/1997 | Lawler |
| 5,724,521 | A * | 3/1998 | Dedrick ............ 705/26 |
| 5,758,259 | A | 5/1998 | Lawler |
| 5,760,821 | A | 6/1998 | Ellis |
| 5,761,662 | A | 6/1998 | Dasan |
| 5,774,170 | A | 6/1998 | Hite |
| 5,805,974 | A | 9/1998 | Hite |
| 5,892,535 | A | 4/1999 | Allen |
| 5,940,073 | A | 8/1999 | Klosterman |
| 6,002,393 | A | 12/1999 | Hite |
| 6,029,045 | A | 2/2000 | Picco |
| 6,061,097 | A | 5/2000 | Satterfield |
| 6,075,551 | A | 6/2000 | Berezowski |
| 6,119,098 | A | 9/2000 | Guyot |
| 6,141,010 | A | 10/2000 | Hoyle |
| 6,151,059 | A * | 11/2000 | Schein et al. ............ 725/37 |
| 6,177,931 | B1 | 1/2001 | Alexander |
| 6,282,713 | B1 | 8/2001 | Kitsukawa |
| 6,360,227 | B1 * | 3/2002 | Aggarwal et al. ........... 707/102 |
| 6,400,996 | B1 * | 6/2002 | Hoffberg et al. ............. 700/83 |
| 6,425,131 | B2 | 7/2002 | Crandall |
| 6,425,134 | B1 | 7/2002 | Huang |
| 6,446,082 | B1 | 9/2002 | Arita |
| 6,459,427 | B1 | 10/2002 | Mao |
| 6,631,523 | B1 | 10/2003 | Matthews, III |
| 6,675,385 | B1 | 1/2004 | Wang |
| 6,684,194 | B1 | 1/2004 | Eldering |
| 6,698,020 | B1 | 2/2004 | Zigmond |
| 6,714,917 | B1 | 3/2004 | Eldering |
| 6,718,551 | B1 | 4/2004 | Swix et al. |
| 6,738,978 | B1 | 5/2004 | Hendricks |
| 6,745,391 | B1 | 6/2004 | Macrae |
| 6,754,904 | B1 * | 6/2004 | Cooper et al. .................. 725/32 |
| 6,799,326 | B2 | 9/2004 | Boylan, III |
| 6,820,062 | B1 | 11/2004 | Gupta |
| 2001/0032333 | A1 | 10/2001 | Flickinger |
| 2003/0020744 | A1 | 1/2003 | Ellis |
| 2003/0036949 | A1 * | 2/2003 | Kaddeche et al. ............. 705/14 |
| 2003/0145323 | A1 | 7/2003 | Hendricks |
| 2003/0200128 | A1 | 10/2003 | Doherty |
| 2003/0208756 | A1 | 11/2003 | Macrae |

FOREIGN PATENT DOCUMENTS

| | | |
|---|---|---|
| WO | WO9828906 | 7/1998 |
| WO | WO9901984 | 1/1999 |
| WO | WO9904561 | 1/1999 |
| WO | WO9911065 | 3/1999 |
| WO | WO9926415 | 5/1999 |
| WO | WO9929109 | 6/1999 |
| WO | WO9955066 | 10/1999 |
| WO | WO9960789 | 11/1999 |
| WO | WO0021287 | 4/2000 |
| WO | WO0033224 | 6/2000 |

OTHER PUBLICATIONS

U.S. Appl. No. 09/857,160, filed Jul. 2001, Flickinger, Gregory.

* cited by examiner

| 401 | 403 |
|---|---|
| ZIP CODE | MEDIAN HOME PRICE |
| 18901 | $175,000 |
| 18910 | $64,000 |
| 18911 | $80,000 |
| 18912 | $110,000 |
| . | . |
| . | . |
| . | . |
| 18920 | $225,000 |

*FIG. 4A*

STARTER HOME PRICES

| ZIP CODE (405) | TOWN (407) | AVERAGE SALE (409) |
|---|---|---|
| 02108 | BOSTON | $204,889 |
| 02158 | NEWTON, MA | 325,378 |
| 10011 | NEW YORK | 422,500 |
| 10128 | NEW YORK | 387,800 |
| 19044 | HORSHAM, PA | 151,411 |
| 19106 | PHILADELPHIA | 184,562 |
| 20007 | WASHINGTON, D.C. | 337,402 |
| 22301 | ALEXANDRIA, VA | 263,323 |
| 27613 | RALEIGH, NC | 190,863 |
| 30033 | DECATUR, GA | 169,271 |
| 30342 | ATLANTA | 318,602 |
| 33186 | MIAMI | 121,568 |
| 33647 | TAMPA, FL | 186,794 |
| 37221 | BELLEVUE, TN | 155,399 |
| 48335 | FARMINGTON, MI | 208,558 |
| 60611 | CHICAGO | 234,124 |
| 60614 | CHICAGO | 327,601 |
| 80015 | AURORA, CO | 176,517 |
| 85044 | PHOENIX | 205,099 |
| 90278 | REDONDO BEACH, CA | 329,251 |
| 91306 | WINNETKA, CA | 164,000 |
| 92117 | SAN DIEGO | 204,620 |
| 94066 | SAN BRUNO, CA | 255,110 |
| 94131 | SAN FRANCISCO | 418,731 |
| 98033 | KIRKLAND, WA | 260,334 |

*FIG. 4B*

| 501 | 503 | 505 | 507 |
|---|---|---|---|
| SUBSCRIBER | ADDRESS | TAX PARCEL # | ASSESED VALUE |
| JOHN & MARY JONES | 12 EUCLID | 96-2-112 | $115,000 |
| JANE DOE | 1550 12TH | 96-3-115 | $350,000 |
| . . . | | | |
| TOM & SHEENA SMITH | 1512 20TH | 96-3-130 | $64,000 |

*FIG. 5*

TARGETED ADVERTISING THROUGH ELECTRONIC PROGRAM GUIDE

CROSS REFERENCE TO RELATED APPLICATION

This application is a continuation of U.S. patent application Ser. No. 09/658,204, filed Sep. 8, 2000 now abandoned, and entitled Targeted Advertising Through Electronic Program Guide, the entire disclosure of which is incorporated herein by reference.

BACKGROUND OF THE INVENTION

Television (TV) viewers are very familiar with printed programming schedules that appear in daily newspapers or weekly magazines, such as TV Guide. The printed program guide lists the various television shows in relation to their scheduled viewing time on a day-to-day basis.

Cable TV systems often include a channel with a video broadcast of the printed program guide. The cable channel is dedicated to displaying listings of programs available on the different available channels. The listings are commonly arranged in a grid. Each column of the grid represents a particular time slot, such as 4:00 p.m. to 4:30 p.m. Each row represents a particular broadcast or cable channel, such as ABC, PBS, or ESPN. The various scheduled programs or shows are arranged within the rows and columns, indicating the channels and times at which they can be found. The grid is continuously scrolled vertically so that a viewer can scan a continuously refreshing set of programs within three or four time slots.

Data regarding the available programs is typically received by a cable system as a plurality of data records. Each available program has a single corresponding data record indicating a variety of information about the program, such as its channel, its starting and ending times, its title, names of starring actors, whether closed-captioning and stereo are available, and perhaps a brief description of the program. It is not difficult to format a grid, such as described above, from this type of data records. The grid is typically formatted once, at the cable system's headend, and broadcast repeatedly and continuously to the thousands of homes served by the cable system.

Newer, interactive cable distribution systems feature electronic program guides (EPGs) which function somewhat similar to the broadcast program listing channels described above. Rather than scrolling automatically, however, an EPG allows a viewer to use a remote control device to scroll as desired both horizontally and vertically through a program grid. This functionality utilizes the two-way communications capabilities of interactive cable systems.

The EPG is typically implemented in software which runs on a set-top box (STB) connected between a TV and a cable system home entry line. When scrolling to a new column or row, the STB inserts the appropriate programming information into each new row or column. This information is either cached at the STB, or requested from the cable system's headend.

Currently, the EPGs are commonly used to help subscribers determine which programming most interests them. They also allow the subscriber to rapidly determine what is available in television programming and to rapidly locate the appropriate channel.

EPGs may also contain advertising, and typically do so by using space in one portion of the screen to display a static advertisement. These advertisements are generally pre-programmed and the same advertisements are displayed to all the subscribers (viewers). Often, the vast majority of the viewers of the advertisement deems the advertisement irrelevant and ignores it.

Thus, there remains a need for a method and an apparatus for delivering targeted advertisements within the EPG.

SUMMARY OF THE INVENTION

The present invention presents a mechanism for matching Electronic Program Guide (EPG) advertisements to subscribers or groups of subscribers and delivering those advertisements within an EPG.

In one embodiment, the subscribers are initially characterized in different groups by using commercially available data, such as demographic data. Furthermore, the groups of subscribers may be formed according to their characteristics. These characteristics may be derived from, but are not limited to, demographic data, geographic information or individual subscriber selection data. Subsequent to the formation of the groups, suitable advertisements to be placed in EPG avails are selected based on the matching of the advertisement characteristics to the characteristics of the groups. The EPG avails are the advertising opportunities available within the EPG.

Different versions of the EPG having targeted advertisements may be created, and the different versions may be placed on a download server for transmission over an access system to the subscriber. The subscriber end is assigned to a particular group and thus may receive the EPG that corresponds to that group. The subscriber end generally comprises a suitable subscriber interface, such as a set-top box (STB) or a cable-ready television having a unique identification. Alternatively, based on pre-determined parameters, an appropriate EPG screen may be selected at the network operator end and transmitted to the subscriber end.

Generally, the EPG and the associated advertisements are graphic information contained in a binary file. In accordance with the principles of the present invention, multiple versions of the EPG may be created and labeled in a manner that indicates that they are associated with a particular group. Alternatively, HTML-based applications may be utilized, and the advertisements may be treated as objects in the EPG page whereby different versions of the EPG screens may be created by utilizing different objects.

In an alternate embodiment, the STB may receive a plurality of EPG screens from a download server and, based on subscriber preferences and EPG interactions, select an appropriate EPG screen. Periodically, additional EPG screens may be sent to the set-top box from the download server offering more selections for the subscriber (i.e., each time the set-top box is powered-on).

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 4A and 4B illustrate exemplary use of public information based on median home prices or starter home prices;

FIG. 5 illustrates an exemplary tax assessment data that can be used for determining the applicability of an advertisement;

DETAILED DESCRIPTION OF THE PREFERRED EMBODIMENT

Figure 1:
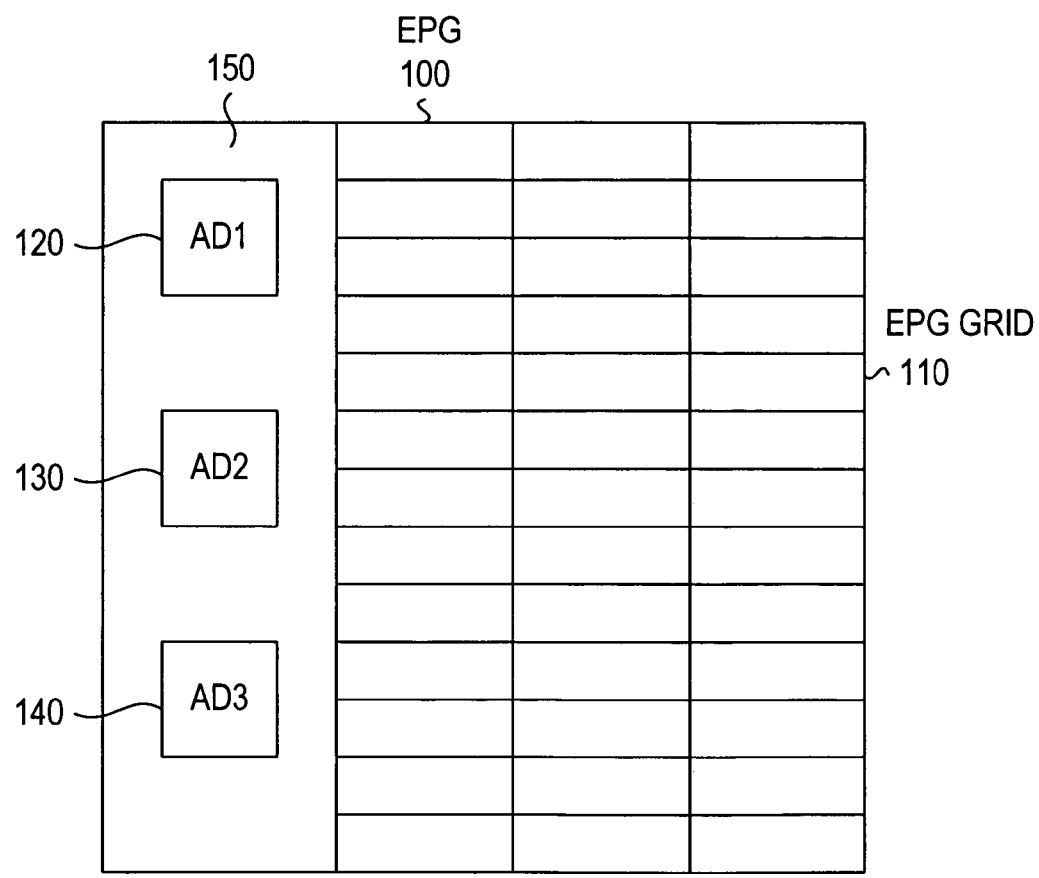
FIG. 1 is a graphic representation of an Electronic Program Guide (EPG) with advertisements.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

FIG. 1 illustrates an Electronic Program Guide (EPG) with a separate section specifically for the display of advertisements. The EPG 100 may be divided into many different sections, that may include but are not limited to, program information, advertisements, and other public information. EPG advertising avails 150 can be further sub-divided to display numerous advertisements 120, 130, and 140 at a single instance. An EPG Grid 110 contains program information such as time of day, channel title, channel id, program title, program rating, and length of program. The information displayed in the EPG Grid 110 is sent to set-top boxes (STB) from an EPG provider. In a similar way, advertisements are sent to the STB to be displayed in the EPG advertisement avail 150. Unlike prior art, where the EPG provider sends the same data to every STB, the present invention describes a way to send different EPG advertising data to each STB based on personal profiles and individual preferences.

Figure 2:
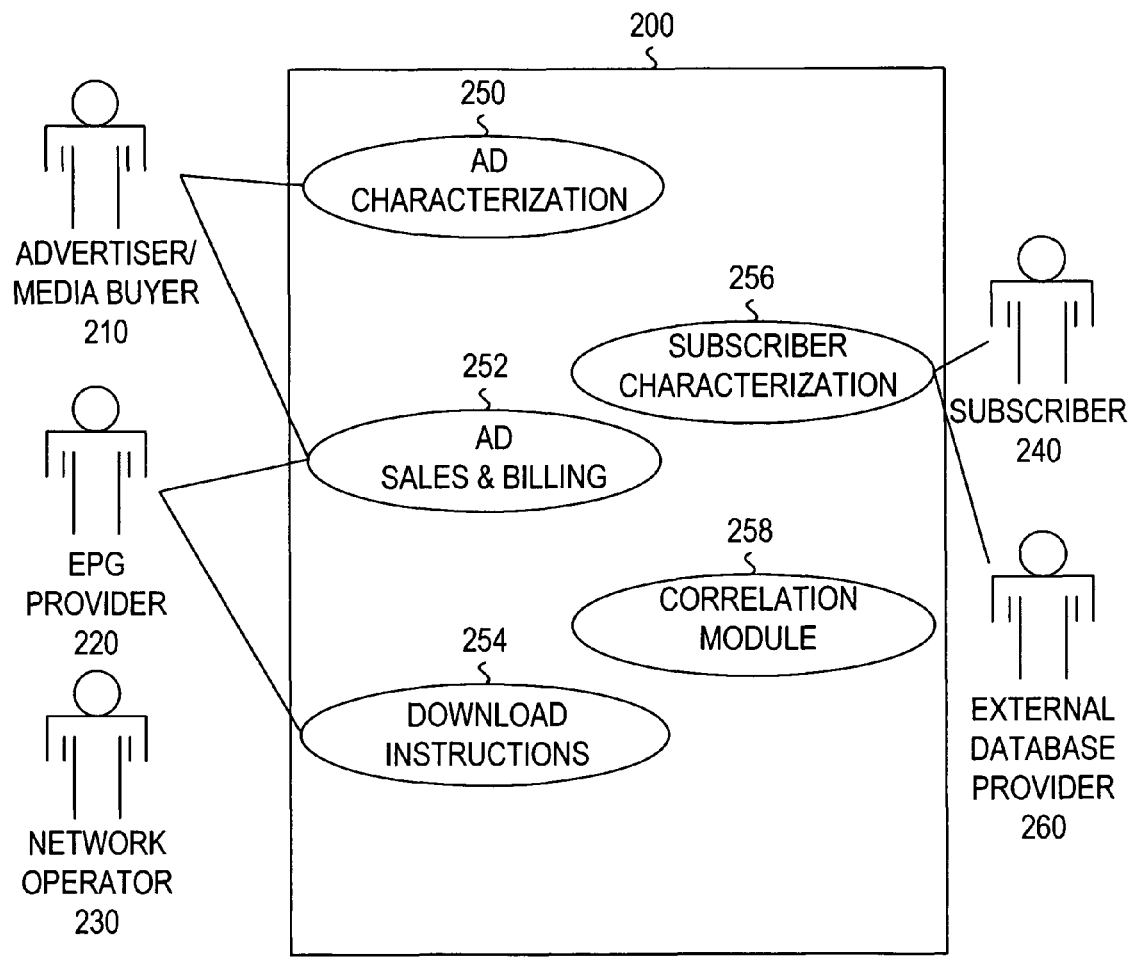
FIG. 2 shows a user relationship diagram of the present invention.

FIG. 2 illustrates an exemplary EPG advertisement management system (AMS). The AMS 200, in accordance with the principles of the present invention, consists of one or more subsystems (modules) configured for characterizing one or more advertisements, characterizing one or more subscribers, correlating the advertisement with a subscriber or group of subscribers, pricing and selling the advertisements, and downloading the target advertisement in the EPG for display to the subscribers. The sales of the advertisement may occur either through a traditional placement sale where an advertisement representative sells the available EPG slots or may occur in an Internet based sale where advertisers buy spots (EPG avails) on-line.

In an exemplary case of FIG. 2, the AMS 200 comprises an ad characterization module 250, an advertising sales and billing module 252, a download instructions module 254, a subscriber characterization module 256, and a correlation module 258. The AMS 200 interfaces with advertiser/media buyers 210, an EPG provider 220, a network operator 230, subscribers 240 and an external database provider 260. The external databases may provide relevant information about the subscribers, such as demographic information and psychographic information.

The ad characterization module 250 allows one or more advertisers/media buyers 210 to enter key characterization data regarding the advertisement and the target market. The subscriber characterization module 256 allows for the collection of subscriber data. The subscriber data can be collected from a variety of sources including private databases and public databases located externally to the AMS 200. These databases generally contain information relevant to the subscriber.

The correlation module 258 correlates the ad characterization information with the subscriber/node characterization information to produce a demographic correlation, and also correlates the ad characterization information with the advertising opportunities characterization to produce an EPG avail correlation. Generally, the correlation module 258 collects information about all advertising opportunities matching the basic time duration and EPG characteristics, along with the EPG screen they are presently linked to, and creates a combined correlation between the advertisement and the advertising opportunity listed.

The ad sales and billing module 252 utilizes information regarding the EPG advertisement avails (received from EPG provider 220) in conjunction with the results of the correlation to complete the transaction. The ad sales and billing module 252 also calculates the placement of the advertisements based on the degree of correlation and a pricing scheme that suitably determines the price to be charged to advertiser/media buyer 210 for the placement of the advertisement in the EPG avails. The prices may be directly proportional to the correlation results, for example, the higher the correlation, the higher the price.

The download instructions module 254 sends the appropriate EPG screen to the STB. This information is sent periodically to the STB to update the EPG avails to present within the EPG screen. The EPG avails may be preloaded into the EPG screen by the download instructions module 254 or downloaded to the STB to be loaded at the STB.

Figure 3:
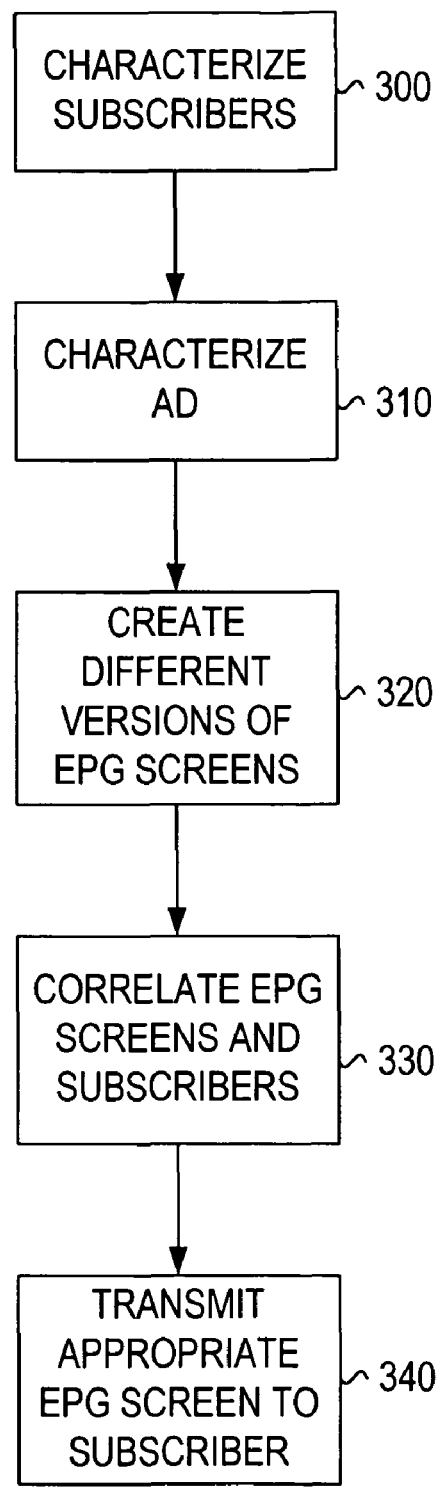
FIG. 3 is a flowchart illustrating an exemplary process for matching EPG advertisements to subscribers and delivering those advertisements within the EPG.

FIG. 3 is a simple flow diagram illustrating an exemplary process for matching EPG advertisements to subscribers and delivering those advertisements within the EPG. At step 300, the subscriber is characterized. In the present invention, the subscriber characteristics data may be collected from a variety of sources including private, external and/or public databases that contain information relevant to the subscriber. These databases may be located externally to the AMS 200.

With respect to private data, the private data may be collected from the subscriber, for instance, when the subscriber signs up for service they may be asked to answer a few questions. The subscriber may also be offered incentives for providing private information, for example, the subscriber may receive product promotions or other offers in return for filling out a few basic forms. The subscriber may also be provided access to his/her private data stored in the system and may access it to assure the integrity of the data (i.e., the data accurately reflects his interests and lifestyle).

The subscriber characterization data at step 300 may be based on an individual subscriber or a household. Techniques evolving the coarse discrimination of subscribers may be used to associate a serving area with a particular advertisement.

The specific targeting may also be based on public information such as median home prices or starter home prices, which may be used to determine multiple demographic parameters, such as an approximate income range for the family. These prices can be further associated with zip codes, as shown in FIGS. 4A and 4B. FIG. 4A illustrates median home prices (403) for zip codes (401). FIG. 4B illustrates average sale prices (409) for starter homes by zip codes (405) and corresponding towns (407). FIG. 5 illustrates an example of tax assessment data that may be used as a factor in determining the applicability of an advertisement. In the case of tax assessment data, the subscriber's name (501), address (503) and tax parcel number (505) are known along with an assessed value (507) of the property.

It is to be noted that the publicly available data is not restricted to real estate data, but can include a variety of demographic data including median household age, household income, race and other characteristics which can be determined on a group or individual level.

Private data may also be amassed and can include specific viewing habits or purchase records of the subscriber. The private data may also be purchased from external sources for a fee. Alternatively, the subscriber may complete questionnaires and forms that indicate lifestyle, product preferences, and previous purchases. All the available private and public information may be used in the subscriber characterization process step 300 for characterizing one or more subscribers. The subscriber characteristics may be based upon some known features. For example, it is known that the Nielsen data tracks the number of households watching particular TV programming. In accordance with the principles of the present invention, such information may be used to characterize one or more characteristics of the subscribers.

Referring back to FIG. 3, at step 310, advertisers enter parameters through an advertiser interface, such as a Web (browser) interface, to characterize their advertisement and form ad characterization vectors. The advertiser may manually create ad characterization vectors by entering useful information via the browser interface. In this case, the ad characterization vector contains a simple deterministic value (0 or 1) for each category. Alternatively, the vectors may contain probabilistic distributions and may allow advertisers to develop more complex models for the target market.

The principles of the present invention are flexible and may operate with either simple deterministic values or with complex models. Furthermore, heuristic rules may be defined for generating ad characterization vectors. These heuristic rules are logical rules or conditional probabilities that aid in the formation of ad characterization vectors. The heuristic rules in logic form allow the system to apply generalizations that have been learned from external studies. In the case of conditional probabilities, determinations are based on statistical probabilities that define ad characterization vectors.

Furthermore, advertisers may enter one or more parameters to target the advertisement and create advertisement vectors. The choices for these parameters may be presented as pull down selections in a browser utilizing a graphical user interface. In an exemplary case, the following categories may be used:

Advertisement duration: (10 s, 15 s, 30 s, 60 s)
Time of EPG display: (0000-0400, 0400-0800, 0800-1200, 1200-1600, 1600-2000, 2000-0000, no preference)
Household Income: (<$30K, $31K-$50K, $51K-$75K, $76K-$100K, >$100K, no preference)
Household Size: (1, 2, 3-4, 5-6, >6, no preference)
Median household age: (<25, 25-35, 36-45, 46-55, >56, no preference)
Ethnic group: (Caucasian, African American, Hispanic, Asian-Pacific, no preference)

The above-mentioned categories may be assigned weights, and a weighted average may be used to create an advertisement characterization vector. In one implementation, the "no preference" selection may be chosen, and equal weighting may be given to each category of the particular demographic parameter. For example, if no preference is selected for household income, all categories within the household income demographic are assigned a value of 0.2 (1 divided by the number of choices, which in this case is 5). After weights have been assigned to all the categories, one or more ad characterization vectors may be generated based on the weighted categories. These ad characterization vectors assist in characterization of various advertisements. Other categories based on demographic factors, socio-economic factors, and consumption factors (purchase information) may also be used.

At step 320, an operator or video programmer may create different versions of EPG screens (ad avails) to be placed within the EPG. These ad avails are based upon the advertisement characterization vectors generated in step 310. In one embodiment, the EPG and the associated advertisements are graphic information contained in a binary file. Multiple versions of the EPG are created and labeled in a manner that indicates that they are associated with a particular subscriber. In an alternate embodiment, Hyper-Text Markup Language (HTML) is utilized, and the advertisements are treated as objects in the EPG page.

At step 330, ad characterization information may be correlated with the subscriber characterization information to produce a demographic correlation. The demographic correlation is generally performed by taking the dot product of the ad characterization vector with the subscriber characterization vector. Different correlation values are normalized such that the resulting correlation value is normalized to 1, with a value of 1 indicating that the maximum correlation has been obtained. In addition, the ad characterization information may be correlated with the EPG avail characterization to produce an EPG avail correlation.

The correlation values may be calculated for each ad characterization vector and the corresponding subscriber characterization vector, as well as for each ad characterization vector and the EPG avail characterization. In one implementation, the correlations are generated by multiplying corresponding elements of the vector and summing the result (dot product).

Figure 6:
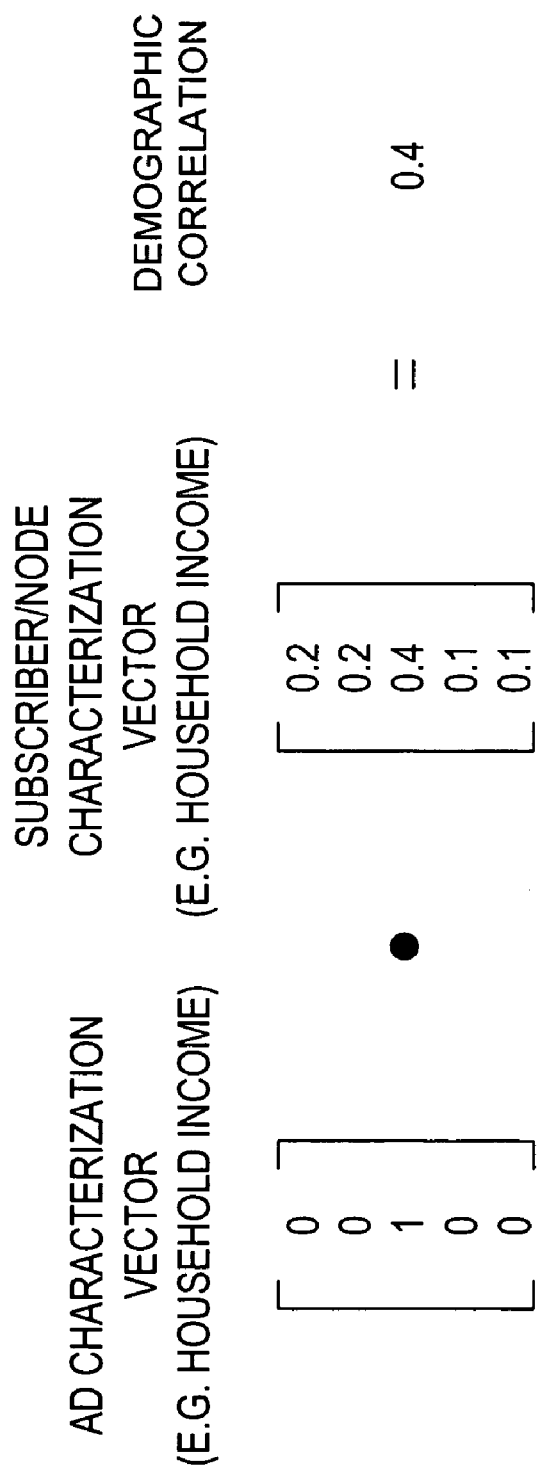
FIG. 6 illustrates an exemplary case of demographic correlation.

An exemplary case of the demographic correlation is illustrated in FIG. 6. The calculation for the EPG avail correlation may be performed similarly. The average value (sum of correlations divided by 2) of the demographic and EPG avail correlations may be calculated to produce an average correlation, which is simply known as the "combined correlation." An impact value may also be calculated which is generally equal to the number of subscribers (estimated viewership) multiplied by the average correlation value.

As illustrated in FIG. 3, once the EPG screens are correlated to the subscribers, the appropriate EPG Screen is transmitted to the subscriber in step 340. In one embodiment, the different EPG screens are sent to the STB of each individual subscriber as binary files. The STB of individual subscribers receives each EPG screen based on the characteristics of the subscriber. In another embodiment, Hyper-Text Markup Language (HTML) is utilized, and the advertisements are sent to the STB of individual subscribers as objects on the EPG. In this embodiment, the browser at the STB is configured to execute the HTML file and add appropriate objects to display an EPG screen having targeted advertisements. The EPG avails may be preloaded into the EPG screens and transmitted to the subscriber or may be downloaded to the STB to be inserted into the EPG screens.

Figure 7:
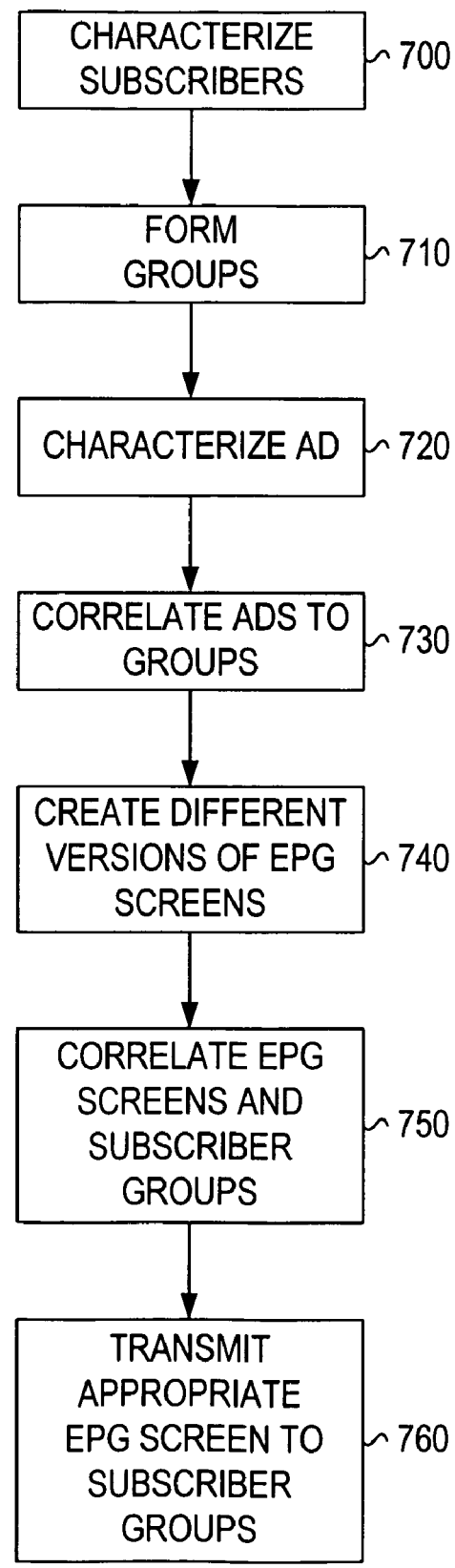
FIG. 7 is a flowchart illustrating an exemplary process for matching EPG advertisements to groups of subscribers and delivering those advertisements within the EPG.

FIG. 7 is a simple flow diagram illustrating an exemplary process for matching EPG advertisements to groups of subscribers and delivering those advertisements within the EPG. Beginning at step 700, subscribers are characterized as previously discussed in FIG. 3. In addition to individual subscribers and households, the subscriber data may be based on a group of subscribers or a group of households. Techniques evolving the coarse discrimination of subscribers and grouping of subscribers into large groups can be used to associate a serving area with a particular advertisement. For example, in a cable television system, it may be determined that a group of subscribers associated with a particular optical distribution node speak a particular language. This knowledge may then be used to direct a particular set of advertisements to that node. As an example, a node associated with Spanish-speaking individuals can have advertisements in Spanish inserted within the EPG.

From the characteristics of the subscribers developed in step 700, groups are formed at step 710. In accordance with the principles of the present invention, the actual formation of groups for advertising is performed by creating multiple lists or tables of subscribers that share one or more subscriber characteristics. The groups may be based on geographic segmentation, demographic segmentation, psychological segmentation, psychographic segmentation, sociocultural segmentation, use-related segmentation, use-situation segmentation, benefit segmentation, and hybrid segmentation. More information may be found in a book entitled "*Consumer Behavior*", by Leon G. Schiffman and Leslie Lazar Kanuk published by Prentice Hall, N.J. 1999.

The analysis of different segmentations permits the advertisement to be directed to specific subscribers or groups of subscribers who fit certain criteria. For instance, an EPG advertisement for a baby stroller could reach parents of children under five years old, and only those individuals in that group. The other publicly or privately available data regarding the subscribers may also be collected. This data may also be mined to form a group of subscribers that have common characteristics, which match the characteristics of the target group.

One technique for forming groups involves utilization of geographic location information. Each group may consist of subscribers located in a particular state, city, or associated with a cable television node. Another technique for forming groups is based on knowledge of the viewership of the actual programming. For example, many companies collect data related to the viewing of the television programming and such information may be used to form groups. Once such collection of data is known as the Nielsen rating, which is based on samples of information related to the viewing of television programming. Similar other types of information are also available. The groups may be based on the actual viewership information, or an estimate of the current viewership, or on the statistical measurement of the viewership.

The actual formation of groups may be accomplished in many different ways. For example, in cable systems having Internet Protocol (IP) capabilities, the groups may be formed by utilizing multicast addresses. Additional groups may be formed from these groups based on geographic locations (i.e., country of residence). These subgroups may also be formed based on a subscriber's operating system, data transmission rate, or other transmission-related parameters. The formation of groups based on geographic information assists in selecting target advertisements that are suitable for each group.

Another embodiment for determining groups is based on using demographic data associated with small market segments, such as Zip+4 data. This embodiment is disclosed in co-pending U.S. application Ser. No. 09/635,542 filed on Aug. 10, 2000 entitled "Grouping Subscribers Based on Demographic Data", which is herein incorporated by reference but is not admitted to be prior art.

Figure 10:
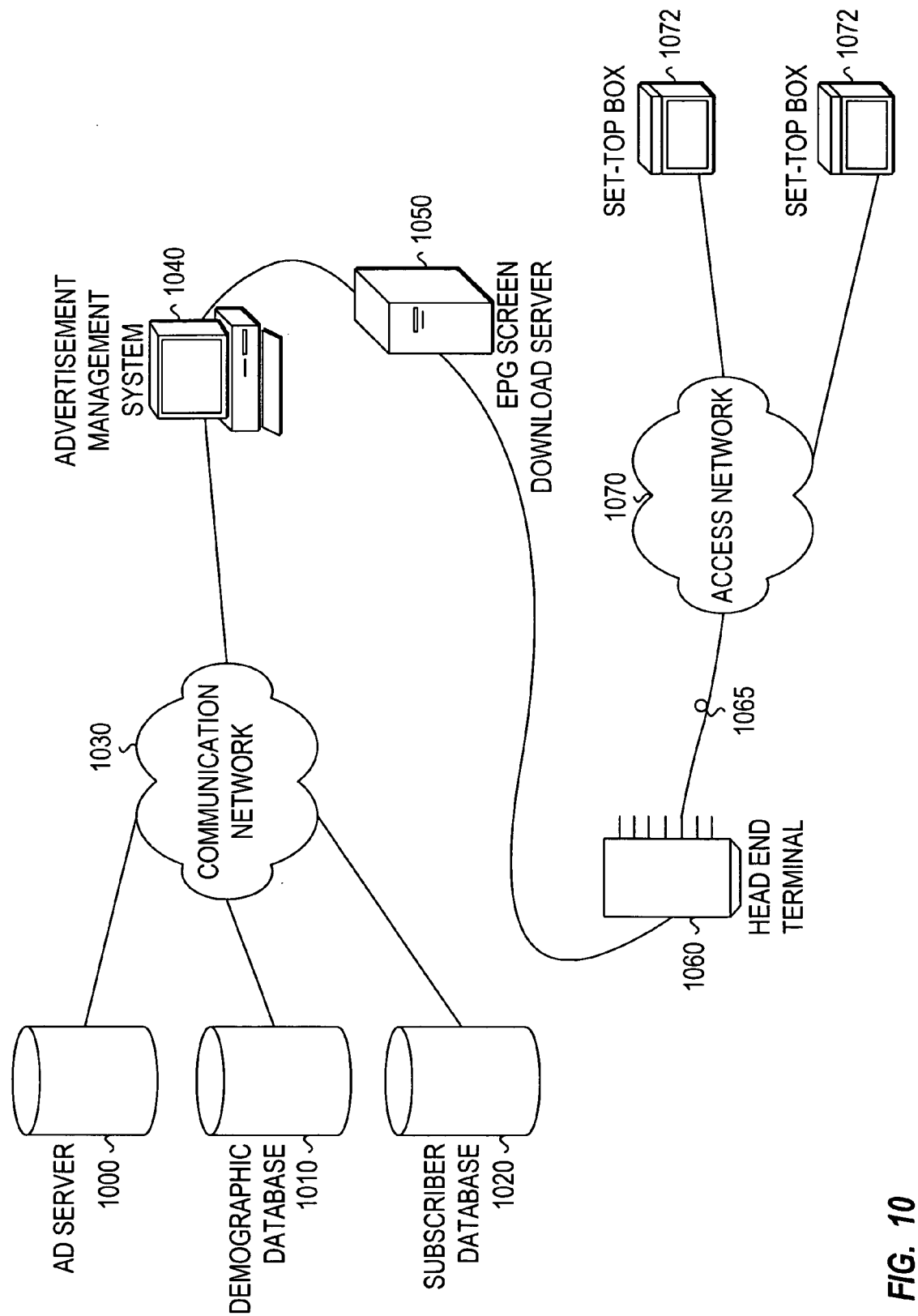
FIG. 10 illustrates an exemplary system that may be used for matching EPG advertisements to particular households or subscribers.

In the cable systems and satellite-based systems, the groups may also be created by utilizing the existing configuration of cable networks. An example is illustrated in FIG. 10. In a cable television system, the subscribers associated with an access network (node) 1070, may be considered to form a group. The nodes are preferred, because traditionally a local head end terminal 1060, serves a large number of viewers/households, wherein a node serves only a few households and thus may be used appropriately to form groups.

In a traditional cable-based system, a node is configured to a plurality of STBs 1072, whereby the STBs 1072 receive transmission signals from the nodes 1070. These transmission signals include EPG data as well EPG advertisements.

Referring back to FIG. 7, step 720 is similar to step 310 as previously described in FIG. 3, where advertisements are characterized in different parameters. At step 730, ad characterization information is correlated with the group characterization information to produce a demographic correlation, and also correlates the ad characterization information with the EPG avail characterization to produce an EPG avail correlation. The correlation is generally performed by taking the dot product of the ad characterization vector with the subscriber characterization vector. Different correlation values are normalized such that the resulting correlation value is normalized to 1, with a value of 1 indicating that the maximum correlation has been obtained.

The correlation values may be calculated for each ad characterization vector and the corresponding group characterization vector, as well as for each ad characterization vector and the EPG avail characterization.

Continuing at this point, steps 740, 750, and 760 are similar to steps 320, 330 and 340, previously described in FIG. 3, wherein different versions of EPG screens are created. The EPG screens are correlated to different subscriber groups, and the appropriate EPG screens, having targeted advertisements, are transmitted to the appropriate subscriber groups.

Figure 8:
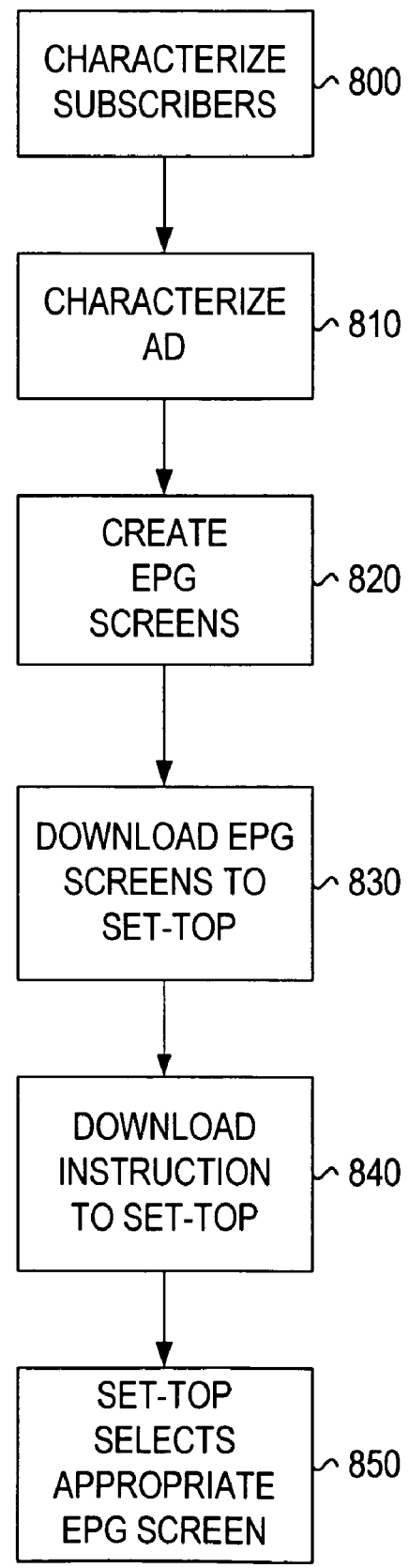
FIG. 8 is a flowchart of an alternate embodiment of the process for matching EPG advertisements to subscribers and delivering those advertisements within the EPG.

FIG. 8 illustrates a flowchart of an alternate embodiment of the process for matching EPG advertisements to subscribers and delivering those advertisements within the EPG. In FIG. 8, steps 800 and 810 are similar to steps 300 and 310 as described in FIG. 3, wherein subscribers as well as advertisements are characterized. At step 820, one or more EPG screens are created. At step 830, all the EPG screens are sent to the STB or are preloaded on the STB upon installation. At step 840, instructions are given to the STB to select an appropriate EPG screen. At step 850, the STB selects the appropriate EPG screen to display based on the subscriber characteristics previously discussed. Furthermore, the STB may get profile information from the subscriber's interactions to substitute the appropriate EPG screen for the individual subscriber and may select the appropriate EPG screen based on the profile information.

Figure 9:
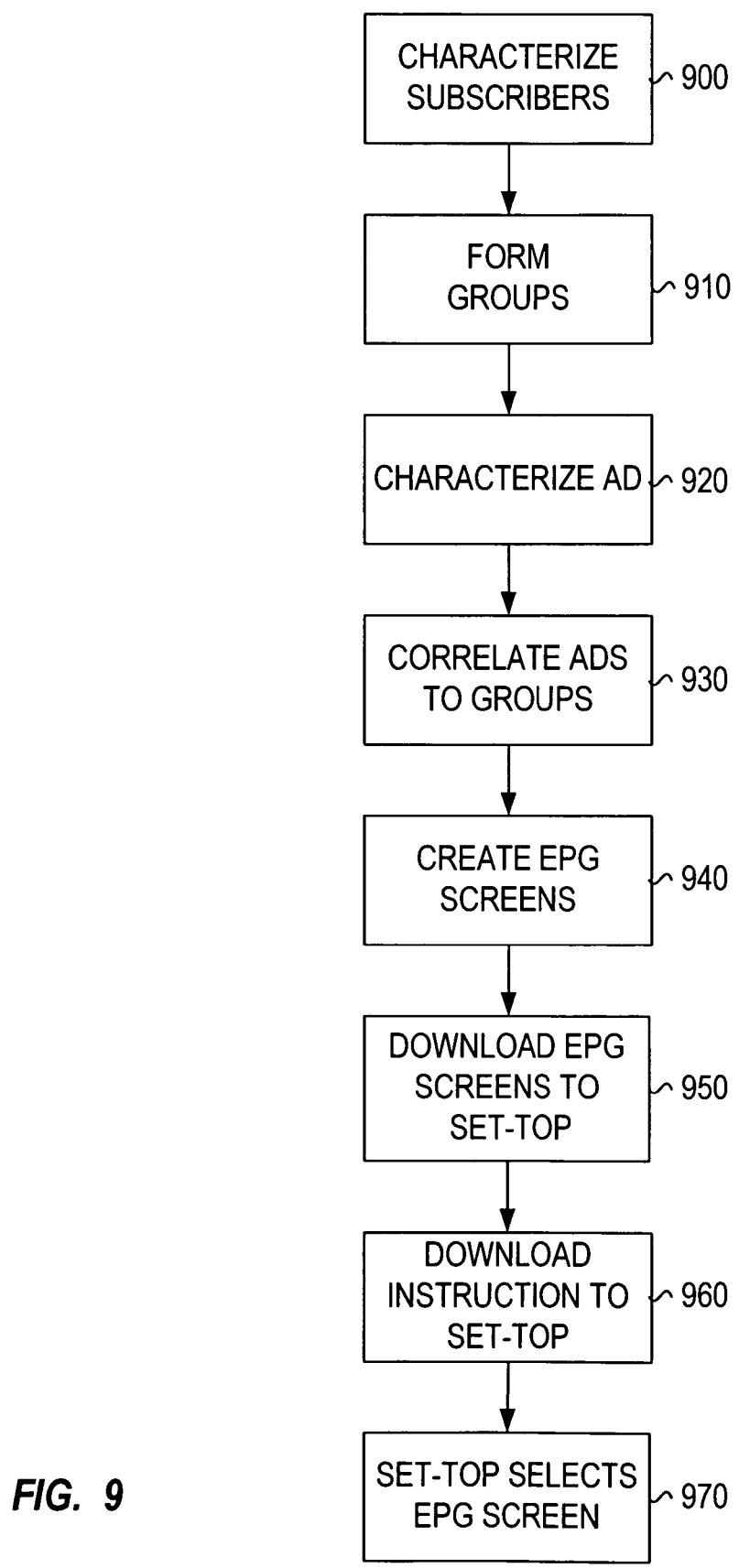
FIG. 9 is a flowchart of an alternate embodiment of the process for matching EPG advertisements to groups of subscribers and delivering those advertisements within the EPG.

FIG. 9 illustrates a flowchart of another embodiment of the process for matching EPG advertisements to a group of subscribers and delivering those advertisements within the EPG. In FIG. 9, steps 900, 910, 920 and 930 are similar to steps 700, 710, 720, and 730 as described in FIG. 7, wherein subscribers are characterized and subscriber groups are formed, advertisements are characterized and advertisements are correlated to the subscriber group. At step 940, one or more EPG screens are created. At step 950, the EPG screens are sent to the STB (or are preloaded on the STB upon installation). In this embodiment, the EPG screens are regularly updated and delivered to the STB to keep the advertisements current. The EPG screens may be delivered periodically (i.e., every day at 0800), over broadcast networks such as cable television (CATV), over-the-air broadcast systems, and switched digital access systems, which use telephone company twisted wire pairs for the delivery of data. At step 950, instructions are downloaded to the STB instructing the STB which EPG screens should be selected. At step 960, the STB selects the appropriate EPG screen to display based on the subscriber's group characteristics previously discussed. Furthermore, the STB may get profile information from the subscriber's interactions to substitute the appropriate EPG screen for the individual subscriber within the group.

It is to be noted that based on subscriber preferences, the download instructions may instruct the STB to select one of the EPG screens. As subscriber preferences/tastes change, the STB instructions appropriately instruct the STB to select a different EPG screen having different targeted advertisements.

FIG. 10 illustrates an exemplary system that may be used for matching EPG advertisements to particular households or subscribers. An Advertising Management System (AMS) 1040 collects data over a communications network 1030 from sources, such as an advertiser's server 1000, a demographic database 1010, or a subscriber database 1020. The AMS 1040 processes this data and correlates advertisements to be placed within the EPG avails for an individual subscriber, a group of subscribers, a household or a group of households. This information is sent to a download server 1050. Advertisements are stored in the download server 1050 to be sent to the appropriate subscriber or group of subscribers (household), by a network operator, such as a cable head end terminal 1060. The head end terminal 1060 distributes the data to the access network 1070 over a network connection 1065. The EPG data is received at the STB 1072 to be displayed on the subscriber's screen as described in FIG. 1.

It is to be noted that the access network may be a cable-based network, a satellite-based network, or a streaming video network. Similarly, the communications network may be an Internet, an Intranet, or other commonly known networks.

Although this invention has been illustrated by reference to specific embodiments, it will be apparent to those skilled in the art that various changes and modifications may be made which clearly fall within the scope of the invention. This invention is intended to be protected broadly within the spirit and scope of the appended claims.

What is claimed is:

1. A method of presenting targeted advertisements to users of a media program service, the method comprising:
   obtaining a characterization of a user, wherein the characterization of the user comprises a subscriber characterization vector;
   obtaining a characterization of each of a plurality of advertisements, wherein the characterization of each of the plurality of advertisements comprises one or more ad characterization vectors, each of the ad characterization vectors representing one or more targeting categories and wherein at least one of the targeting categories is weighted;
   creating by a processor a set of targeted advertisements by performing a first mathematical correlation of the subscriber characterization vector with each of the ad characterization vectors;
   generating an electronic listing of media streams at a central server;
   creating an electronic programming guide page having the electronic listing of media streams and at least one advertisement opportunity;
   obtaining a characterization of the at least one advertisement opportunity, the characterization based at least in part on the electronic listing of media streams;
   selecting a subset of the set of targeted advertisements by performing a second mathematical correlation of the ad characterization vector of each advertisement in the set of targeted advertisements with the characterization of the at least one advertisement opportunity;
   determining a price for inserting a first advertisement from the subset of targeted advertisements into the at least one advertisement opportunity based on an average correlation of the first correlation and the second correlation corresponding to the first advertisement;
   inserting the first advertisement into the at least one advertisement opportunity, based at least in part on the average correlation and the determined price; and
   downloading the electronic programming guide page with the inserted first advertisement to user equipment.

2. The method of claim 1, wherein said first mathematical correlation is realized by taking the dot product of the user characterization vector with the ad characterization vector.

3. The method of claim 1, further comprising:
   displaying the targeted advertisements in the electronic programming guide page.

4. The method of claim 1, wherein the electronic programming guide page is a webpage.

5. The method of claim 1, wherein the listing of electronic media streams includes a plurality of links, each link corresponding to a particular electronic media stream.

6. The method of claim 5, wherein clicking one of the links actuates presentation of the corresponding electronic media stream.

7. The method of claim 1, wherein the electronic listing of media streams is arranged in a grid.

8. The method of claim 1, wherein the media program streams are obtained for presentation via the Internet.

9. The method of claim 1, wherein the electronic listing of media streams includes an image representative of the corresponding media stream.

10. The method of claim 1, wherein the electronic listing of media streams includes a condensed video representative of the corresponding media stream.

11. The method of claim 1, wherein the media program streams are videos.

12. The method of claim 1, wherein the media program streams are in MP3 format.

13. The method of claim 1, wherein the media program streams are in MPEG format.

14. The method of claim 1, wherein the characterization of the user is realized by assigning the user to a category.

15. The method of claim 1, wherein the characterization of the user is based on the demographic characteristics of the user.

16. The method of claim 15, wherein the demographic characteristics of the user are obtained from the multicast address of the user.

17. The method of claim 16, wherein the multicast address is used to determine the geographic location of the user.

18. A method of presenting targeted advertisements to users of a media program service, the method comprising:
   generating at least one electronic listing of media streams at a central server;
   obtaining a characterization of each of a plurality of advertisements, wherein the characterization of each of the plurality of advertisements comprises one or more ad characterization vectors, each of the ad characterization vectors representing one or more targeting categories and wherein at least one of the targeting categories is weighted;

creating at least one set of advertisements based on the ad characterization vectors of each of the plurality of advertisements;

associating, based on a first mathematical correlation between a characterization of the at least one electronic listing of media streams and the ad characterization vectors of each of the plurality of advertisements, each of the at least one electronic listings of media streams with at least one of the sets of advertisements;

obtaining a characterization of a user associated with user equipment, wherein the characterization of the user comprises a subscriber characterization vector;

determining a second mathematical correlation between the subscriber characterization vector and the ad characterization vectors of each of the advertisements in the at least one set of advertisements associated with a first of the at least one electronic listings of media streams;

creating at least one electronic programming guide page having the first electronic listing of media streams and a first set of advertisements selected from the at least one set of advertisements associated with the first electronic listing of media streams, the first set of advertisements selected based on an average correlation of the first correlation and the second correlation, wherein said electronic programming guide page has at least one area for the display of advertisements;

downloading at least one of the at least one electronic programming guide pages to the user equipment; and determining a price for presentation of each advertisement in the set of targeted advertisements based at least in part on the average correlation.

19. The method of claim 18, wherein the at least one electronic listing of media streams is customized based on the characterization of the user.

20. The method of claim 19, wherein the at least one of the electronic programming guide pages downloaded to user equipment corresponds to the characterization of the user.

21. The method of claim 19, further comprising:
displaying the electronic programming guide page corresponding to the user characterization.

22. The method of claim 18, wherein each of the at least one electronic listings of media streams corresponds to at least one category.

23. The method of claim 22, wherein the categories are based on demographic characteristics.

24. The method of claim 22, wherein the categories are formed by analyzing a plurality of user profiles.

25. The method of claim 22, wherein the associating is based on the category of each of the at least one electronic listing of media streams and the category of each set of advertisements.

26. The method of claim 25, wherein the at least one electronic programming guide page is assigned to a category based on the category of the corresponding advertisements and the electronic listings of media streams.

27. The method of claim 18, wherein the electronic programming guide page downloaded to user equipment corresponds to the characterization of the user.

28. The method of claim 18, further comprising:
selecting the electronic programming guide page for display based on the characterization of the user and the category to which the electronic programming guide page corresponds.

29. The method of claim 18, wherein the user equipment is a personal computer.

30. The method of claim 18, wherein the electronic programming guide page is a webpage.

* * * * *